United States Patent
Kyoung et al.

(10) Patent No.: US 10,387,709 B2
(45) Date of Patent: Aug. 20, 2019

(54) SECURITY DEVICE USING COMPRESSIVE IMAGING TECHNOLOGY

(71) Applicant: SAMSUNG ELECTRONICS CO., LTD., Suwon-si (KR)

(72) Inventors: Jisoo Kyoung, Seoul (KR); Chanwook Baik, Yongin-si (KR); Jaesoong Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 527 days.

(21) Appl. No.: 15/062,347

(22) Filed: Mar. 7, 2016

(65) Prior Publication Data
US 2017/0083744 A1    Mar. 23, 2017

(30) Foreign Application Priority Data
Sep. 23, 2015  (KR) .................. 10-2015-0134818

(51) Int. Cl.
*G06K 9/00*    (2006.01)

(52) U.S. Cl.
CPC ..... *G06K 9/00033* (2013.01); *G06K 9/00926* (2013.01); *G06K 2009/00953* (2013.01)

(58) Field of Classification Search
CPC .......... G06K 9/00033; G06K 9/00926; G06K 2009/00953
USPC ................................................ 382/232–253
See application file for complete search history.

(56) References Cited

U.S. PATENT DOCUMENTS

| | | | |
|---|---|---|---|
| 7,317,814 B2 | 1/2008 | Kostrzewski et al. | |
| 9,268,016 B2 | 2/2016 | Smith et al. | |
| 2012/0213270 A1* | 8/2012 | Baraniuk | H04L 25/20 375/240.01 |
| 2013/0043375 A1 | 2/2013 | Baleine et al. | |
| 2013/0058530 A1* | 3/2013 | Naito | G06K 9/00208 382/103 |
| 2013/0201297 A1* | 8/2013 | Jiang | H04N 5/335 348/49 |
| 2013/0335256 A1 | 12/2013 | Smith et al. | |

(Continued)

FOREIGN PATENT DOCUMENTS

| | | |
|---|---|---|
| JP | 2009-129210 A | 6/2009 |
| KR | 10-2015-0042746 A | 4/2015 |
| KR | 10-2015-0048334 A | 5/2015 |

(Continued)

OTHER PUBLICATIONS

Thanki, Rohit, and Komal Borisagar. "A novel robust digital watermarking technique using compressive sensing for biometric data protection." IJECCE 4.4 (2013): 1133-9.*

(Continued)

*Primary Examiner* — Andrew M Moyer
(74) *Attorney, Agent, or Firm* — Sughrue Mion, PLLC

(57) ABSTRACT

A security device using compressive imaging technology is provided. The security device includes a supporter configured to support a recognition object, a light source configured to irradiate light towards the recognition object, a mask configured to code light that is reflected from the recognition object, the coded light corresponding to an image of the recognition object, and a light receiver and processor configured to compress the coded light into a compressed image, and store the compressed image.

10 Claims, 7 Drawing Sheets

(56) References Cited

U.S. PATENT DOCUMENTS

2014/0353187 A1* 12/2014 Murrey .................... A45F 5/02
206/316.3
2016/0180071 A1* 6/2016 Thuillier ................ G06F 21/32
726/18

FOREIGN PATENT DOCUMENTS

WO  2006/116134 A2  11/2006
WO  2013/119593 A1  8/2013

OTHER PUBLICATIONS

Jun Li, et al., "Compressive Optical Image Encryption", Scientific Reports, May 20, 2015, pp. 1-10.

\* cited by examiner

FIG. 3

| (1,1) | (1,2) | (1,3) | (1,4) |
| (2,1) | (2,2) | (2,3) | (2,4) |
| (3,1) | (3,2) | (3,3) | (3,4) |
| (4,1) | (4,2) | (4,3) | (4,4) |

| (1,1) | (1,2) | (1,3) | (1,4) |
| (2,1) | (2,2) | (2,3) | (2,4) |
| (3,1) | (3,2) | (3,3) | (3,4) |
| (4,1) | (4,2) | (4,3) | (4,4) |

| (1,1) | (1,2) | (1,3) | (1,4) |
| (2,1) | (2,2) | (2,3) | (2,4) |
| (3,1) | (3,2) | (3,3) | (3,4) |
| (4,1) | (4,2) | (4,3) | (4,4) |

FIG. 4C

| (1,1) | (1,2) | (1,3) | (1,4) |
|---|---|---|---|
| (2,1) | (2,2) | (2,3) | (2,4) |
| (3,1) | (3,2) | (3,3) | (3,4) |
| (4,1) | (4,2) | (4,3) | (4,4) |

| (1,1) | (1,2) | (1,3) | (1,4) |
|---|---|---|---|
| (2,1) | (2,2) | (2,3) | (2,4) |
| (3,1) | (3,2) | (3,3) | (3,4) |
| (4,1) | (4,2) | (4,3) | (4,4) |

52

SECURITY DEVICE USING COMPRESSIVE IMAGING TECHNOLOGY

CROSS-REFERENCE TO RELATED APPLICATION

This application claims priority from Korean Patent Application No. 10-2015-0134818, filed on Sep. 23, 2015 in the Korean Intellectual Property Office, the disclosure of which is incorporated herein in its entirety by reference.

BACKGROUND

1. Field

Apparatuses consistent with exemplary embodiments relate to security devices, and more particularly, to fingerprint recognition security devices that use compressive imaging technology.

2. Description of the Related Art

In a security device that is currently used for fingerprint recognition, a person is identified such that, after optically photographing a fingerprint image of the person, the fingerprint image is compared with an original fingerprint image of the person that is stored in the security device in advance.

In the current security device, user fingerprint image information, that is, the original fingerprint image stored in the security device may be disclosed by hacking or a mistake of a user. The disclosed fingerprint information may be used for making fingerprint information of the user, that is, for making the same fingerprint of the user.

Thus, the fingerprint recognition security device of the related art may render the security function of a security device useless when the stored fingerprint image, that is, the original fingerprint image, is leaked.

SUMMARY

Exemplary embodiments may address at least the above problems and/or disadvantages and other disadvantages not described above. Also, the exemplary embodiments are not required to overcome the disadvantages described above, and may not overcome any of the problems described above.

One or more exemplary embodiments provide security devices that use compressive imaging technology to increase security reliability by enhancing security function.

According to an exemplary embodiment, there is provided a security device including a supporter configured to support a recognition object, a light source configured to irradiate light towards the recognition object, a mask configured to code light that is reflected from the recognition object, the coded light corresponding to an image of the recognition object, and a light receiver and processor configured to compress the coded light into a compressed image, and store the compressed image.

The supporter may be a part of one among a display device, a mobile device, a gate, a storage box, and a safe.

The mask may include a mask plate.

The mask plate may be an active mask plate including pixels.

The pixels may include graphene or a two-dimensional material.

The mask may include masks, and the masks may have different respective optical patterns.

The light receiver and processor may include a light detector configured to detect the coded light, a memory configured to store the compressed image, and a controller configured to compress the detected light into the compressed image, and restore the image from the compressed image.

The light detector may include a pixel.

The memory may be further configured to store instructions configured to cause the controller to compress the detected light into the compressed image, and restore the image from the compressed image.

The controller may be further configured to control the mask to have a first optical pattern to generate a first coded light, control the mask to have a second optical pattern to generate a second coded light, and compress the first coded light and the second coded light into a first compressed image and a second compressed image, respectively.

The memory may be further configured to store the first compressed image and the second compressed image in respective memory regions to generate a final compressed image corresponding to the recognition object.

BRIEF DESCRIPTION OF THE DRAWINGS

The above and/or other aspects will be more apparent by describing exemplary embodiments with reference to the accompanying drawings, in which:

FIG. 3 is a plan view of a single mask plate included in a mask according to an exemplary embodiment;

FIGS. 4A, 4B, 4C and 4D are diagrams of the single mask plate of FIG. 3, expressing four random patterns that are different from each other;

DETAILED DESCRIPTION

Figure 1:
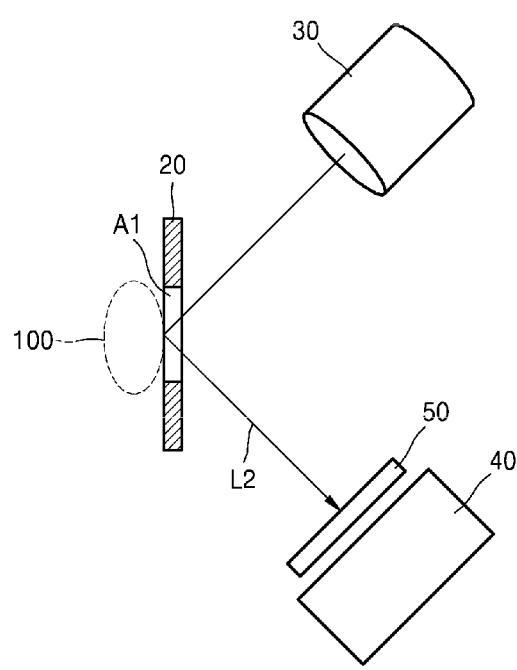
FIG. 1 is a schematic diagram of a security device using a compressive imaging according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

It will be understood that the terms "comprises" and/or "comprising" used herein specify the presence of stated features or components, but do not preclude the presence or addition of one or more other features or components. In addition, the terms such as "unit," "-er (-or)," and "module" described in the specification refer to an element for performing at least one function or operation, and may be implemented in hardware, software, or the combination of hardware and software.

In the drawings, thicknesses of layers and regions may be exaggerated for clarity of layers and regions.

FIG. 1 is a schematic diagram of a security device using compressive imaging according to an exemplary embodiment.

Referring to FIG. 1, the security device according to an exemplary embodiment includes a supporter 20, a light source 30, a mask 50, and a light receiver and processor 40. The supporter 20 may be a portion of a region of a surface of an apparatus or a device in which the security device that includes the light source 30, the mask 50, and the light receiver and processor 40 are mounted. The device may be a display device (for example, a TV) or a mobile device. The apparatus may be a gate, a storage box, or a safe. The supporter 20 is a region where a recognition object 100 having identification is positioned or contacted and supports the recognition object 100. The recognition object 100 may be a finger. At this point, the identification may be a fingerprint of a finger. When the recognition object 100 is positioned on the supporter 20, the identification (for example, a fingerprint) is positioned to contact the supporter 20. A region of the supporter 20 that is in contact with the recognition object 100 may be a transparent region A1 with respect to light.

Accordingly, light emitted from the light source 30 may enter the transparent region A1 of the supporter 20, and at least some of the light reaches the recognition object 100. The light source 30 may be slantly disposed at a given angle with respect to the surface of the supporter 20 that contacts the recognition object 100. The light source 30 may be disposed on a location where the light emitted from the light source 30 enters the transparent region A1 of the supporter 20. The light source 30 may emit coherent light such as a laser beam. The light source 30 may also emit non-coherent light. In this case, the light source 30 may be a light-emitting diode (LED) that emits monochromatic light (for example, red light).

The mask 50 and the light receiver and processor 40 may be disposed at a given angle with respect to the surface of the supporter 20 that is in contact with the recognition object 100. The mask 50 and the light receiver and processor 40 may be disposed symmetrically with respect to the light source 30 with the supporter 20 as a center. The mask 50 and the light receiver and processor 40 may be disposed parallel to each other in a row. The light receiver and processor 40 is disposed next to the mask 50. The mask 50 may be disposed on a location where light L2 reflected by the supporter 20 is received, and the light L2 is some of light emitted towards the supporter 20 from the light source 30 to recognize the recognition object 100. The mask 50 and the light receiver and processor 40 may be separated from each other or may contact each other.

When the recognition object 100 is positioned on the supporter 20, the light L2 reflected at the transparent region A1 of the supporter 20 may include information of identification of the recognition object 100. The light L2 reflected at the transparent region A1 of the supporter 20 is changed to light having a predetermined pattern, that is, a coded light while passing through the mask 50. Accordingly, an image of the identification is changed to a coded image. This is due to an optical pattern included in the mask 50. The mask 50 may express or include a plurality of random optical patterns. FIGS. 4A through 4D show an example of random optical patterns.

Figure 3:
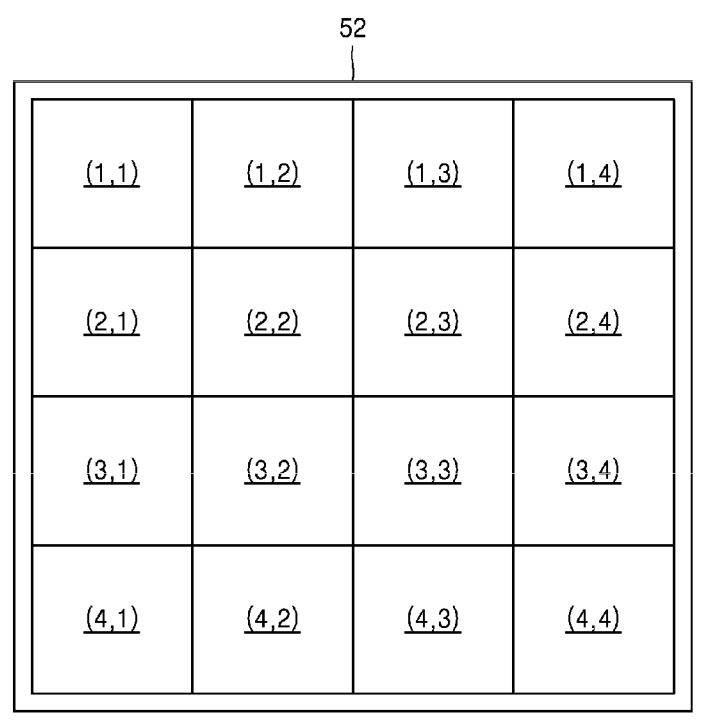

Referring again to FIG. 1, the mask 50 may include a plurality of masks or a single mask plate. When the mask 50 includes a plurality of masks, the masks may have random optical patterns different from each other. When the mask 50 includes the plurality of masks, the masks may be positioned on the path of the light L2 one at a time according to a process of forming a coded compressive image that is described later. When the mask 50 includes the single mask plate, as depicted in FIG. 3, the single mask plate may be an active-type mask that may express various types of random patterns by including a plurality of pixels (1,1) through (4,4). The active-type mask will be described below.

The light (coded light) having a predetermined pattern by passing through the mask 50 is incident to the light receiver and processor 40. The light receiver and processor 40 performs a process of recognizing the recognition object 100 by receiving the incident light, that is, a process of registering the identification as an original identification or a process of comparing the identification to an original identification that is stored in advance.

Figure 2:
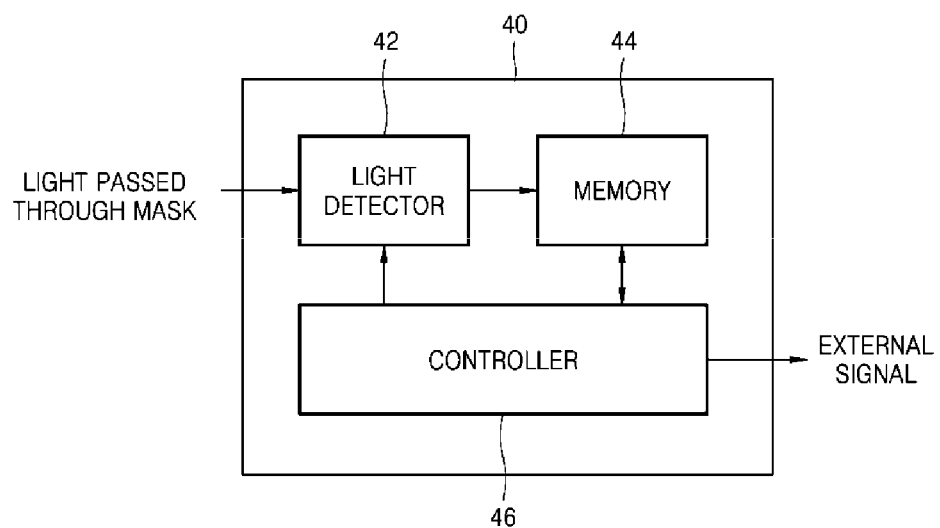
FIG. 2 is a block diagram of a configuration of a light receiver and processor of FIG. 1.

FIG. 2 is a block diagram of a configuration of the light receiver and processor 40 of FIG. 1.

Referring to FIG. 2, the light receiver and processor 40 includes a light detector 42, a memory 44, and a controller 46 (or a central processing unit). The light receiver and processor 40 may further include other elements.

The light detector 42 receives light that enters the light receiver and processor 40. That is, light passing through the mask 50 enters the light detector 42. The light detector 42 may include a single pixel.

A compressive imaging process may be performed with respect to the light (coded light) detected by the light detector 42. The compressive imaging process may be performed by the controller 46. Compressive imaging software may be used for the compressive imaging process. The compressive imaging software may be stored in the memory 44. The compressive imaging software may be compressive imaging software that is well-known in the art. An image compressed by the compressive imaging process is stored in a determined region of the memory 44. To store the compressed image, the memory 44 may include a separate memory region. A process of storing the compressed image in the memory region will be described below with reference to FIGS. 4 and 5. A process of registering (storing) the identification (for example, a fingerprint) of an owner (a user) of the security device in the memory 44 may be performed in the same process as the process of recognizing the identification.

The coded compressive image of the identification of the owner of the security device may be restored to the original image by using a restoration algorithm (for example, an algorithm that minimizes $l_1$-norm) together with the information with respect to the mask 50. The restoration algorithm may be a well-known restoration algorithm in the art. The process of restoration may be controlled by the controller 46 and the restoration algorithm may be stored in the memory 44. The restoration algorithm process may also be applied to a case in which the coded compressive image is transmitted and then restored in a plurality of security devices that share information of the mask 50. As described above, the controller 46 generates a coded compressive image and stores the coded compressive image in the memory 44 by controlling the compressive imaging process, and may restore the coded compressive image or the coded compressed original image that is stored in the memory 44 to an original image.

The compressive imaging process with respect to the identification of the recognition object 100 may be repeated several times, and the pattern types formed in the mask 50 may be changed in each of the compressive imaging processes. The controller 46 may control the operation of the mask 50 so that different mask patterns are formed in the mask 50 in each of the repeated compressive imaging processes by generating external signals in the repeated compressive imaging processes. Accordingly, the mask 50 may express random patterns, that is, random optical patterns. The random patterns expressed through the mask 50 may differ from a security device to another. Accordingly, although information of a random pattern of the mask 50 is exposed to the outside, security may be maintained by scrapping or not using the corresponding apparatus, and thus, the security matter may be simply solved.

FIG. 3 is a plan view of a single mask plate 52 included in the mask 50 according to an exemplary embodiment.

Referring to FIG. 3, the single mask plate 52 includes a plurality of pixels (1,1) through (4,4). A material for forming the pixels (1,1) through (4,4) may be, for example, graphene or a two-dimensional (2D) material. The single mask plate 52 may be a flat panel that may actively control a plurality of regions. For example, the single mask plate 52 may be a liquid crystal panel. In FIG. 3, for convenience of explanation, a pixel array of four columns×four rows (4×4) is depicted. However, the single mask plate 52 may include a further increased or reduced number of pixels. The single mask plate 52 may be an active-type mask plate that may be controlled by an electrical signal. Optical transmittance of each of the pixels (1,1) through (4,4) may be controlled by an electrical signal. The electrical signal for controlling the optical transmittance of each of the pixels (1,1) through (4,4) may be provided by the controller 46. Accordingly, the single mask plate 52 may express various optical patterns and the optical patterns may be random patterns. FIGS. 4A through 4D show an example of random patterns that may be expressed by using the single mask plate 52.

FIGS. 4A through 4D are diagrams of the single mask plate 52 of FIG. 3, expressing four random patterns that are different from each other.

FIG. 4A shows a case in which a pixel (1,1) located on the first row and the first column, a pixel (1,3) located on the first row and the third column, a pixel (3,2) located on the third row and the second column, and a pixel (4,4) located on the fourth row and the fourth column are in an "ON state" (optical transmission state), and the remaining pixels are in an "OFF state" (optical blocking state). A reverse case may also be possible. That is, in FIG. 4A, in the single mask plate 52, the pixels in an "ON state" may be changed to an "OFF state" and the pixels in an "OFF state" may be changed to an "ON state."

FIG. 4B shows a case in which the optical transmittance states (for example, an "ON state") of a pixel (2,2) located on the second row and the second column, a pixel (3,4) located on the third row and the fourth column, and a pixel (4,1) located on the fourth row and the first column are different from the optical transmittance states (for example, an "OFF state") of the remaining pixels.

FIG. 4C shows a case in which the optical transmittance states (for example, an "ON state") of a pixel (1,2) located on the first row and the second column, a pixel (2,4) located on the second row and the fourth column, a pixel (3,1) located on the third row and the first column, and a pixel (4,3) located on the fourth row and the third column are different from the optical transmittance states (for example, an "OFF state") of the remaining pixels.

FIG. 4D shows a case in which the optical transmittance states (for example, an "ON state") of a pixel (1,1) located on the first row and the first column, a pixel (1,4) located on the first row and the fourth column, a pixel (4,1) located on the fourth row and the first column, and a pixel (4,4) located on the fourth row and the fourth column are different from the optical transmittance states (for example, an "OFF state") of the remaining pixels.

Accordingly, lights transmitted through the random patterns shown in FIGS. 4A through 4D have different optical patterns from each other, and as a result, light transmitted through the single mask plate 52 has a coded pattern. Thus, as long as the information (for example, an ON/OFF state of each pixel) of the pattern expressed on the single mask plate 52 that is used for obtaining the coded optical pattern is not known, the identification with respect to the coded pattern may not be identified even though the restoration algorithm is known.

A process of generating a coded compressive image formed by using the patterns shown in FIGS. 4A through 4D and a process of storing the coded compressive image will now be described with reference to FIG. 5.

Figure 5:
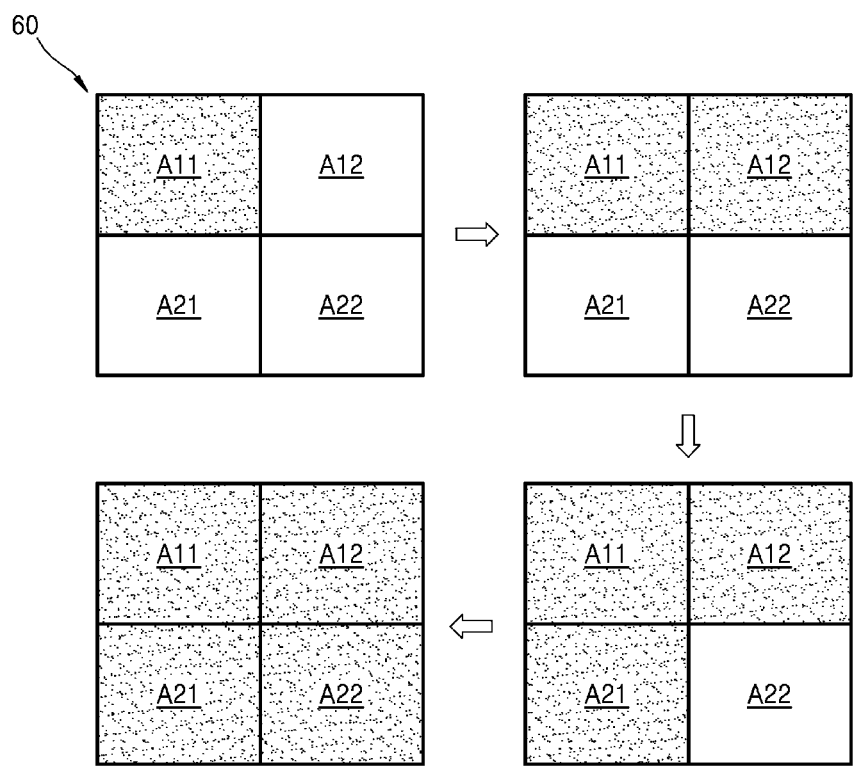
FIG. 5 is a diagram illustrating a process of storing coded compressive images in four regions of a memory region of a memory, corresponding to the four different patterns formed in the single mask plate of FIGS. 4A, 4B, 4C and 4D.

FIG. 5 is a diagram illustrating a process of storing coded compressive images in four regions of a memory region 60 of the memory 44, corresponding to the four different patterns formed in the single mask plate of FIGS. 4A through 4D.

Referring again to FIGS. 1 and 2, when the recognition object 100 is positioned on the supporter 20, light reflected at the recognition object 100 passes through the mask 50, and the reflected light includes information (for example, a fingerprint information) of an identification. At this point, the mask 50 may be controlled so that the pattern shown in FIG. 4A is expressed on the mask 50. The light transmitted through the mask 50 is a first coded light. The first coded light is detected by the light detector 42, and is to be a first compressed image through a compressive imaging process. As depicted in FIG. 5, the first compressed image is stored in a first region A11 of the memory region 60.

Referring again to FIGS. 1 and 2, the mask 50 may be controlled so that the pattern shown in FIG. 4B is expressed on the mask 50. In this state, light reflected by the recognition object 100 is transmitted through the mask 50. The light transmitted through the mask 50 is to be a second coded light. The second coded light is detected by the light detector 42 and is to be a second compressed image through a compressive imaging process. The second compressed image, as depicted in FIG. 5, is stored in a second region A12 of the memory region 60.

Referring again to FIGS. 1 and 2, the mask 50 may be controlled so that the pattern shown in FIG. 4C is expressed on the mask 50, and a third coded light is generated through the process described above. After forming a third compressed image, as depicted in FIG. 5, the third compressed image is stored in a third region A21 of the memory region 60.

Referring again to FIGS. 1 and 2, the mask 50 may be controlled so that the pattern shown in FIG. 4D is expressed on the mask 50, and a fourth coded light is generated through the process described above. After forming a fourth compressed image, as depicted in FIG. 5, the fourth compressed image is stored in a fourth region A22 of the memory region 60. In this manner, a coded compressive image with respect to the identification of the recognition object 100 is stored in the memory 44.

Figure 6:
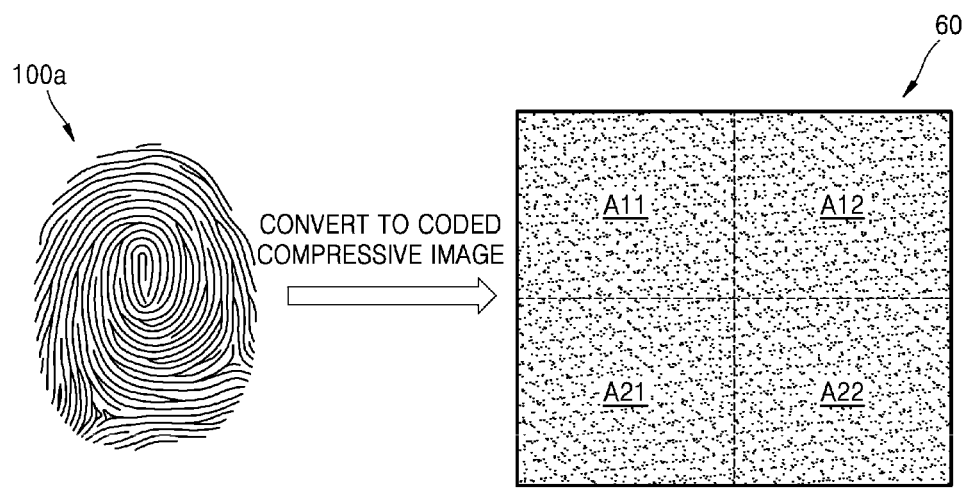
FIG. 6 is a coded compressive image corresponding to a recognition part of a recognition object according to an exemplary embodiment.

FIG. 6 is a coded compressive image corresponding to a recognition part of the recognition object 100 according to an exemplary embodiment.

All of the first through fourth compressed images respectively stored in the first through fourth regions A11, A12, A21, and A22 of the memory region 60, as depicted in FIG.

6, form a single compressed image, and the single compressed image may correspond to a fingerprint 100a as an example of the identification of the recognition object 100. After obtaining a final compressed image with respect to the identification by storing the first through fourth compressed images respectively in the first through fourth regions A11, A12, A21, and A22 of the memory region 60, it is determined whether the recognition object 100 is the owner of the security device by comparing the obtained compressed image with a registered original compressed image stored in the memory 44.

Referring to FIG. 6, the compressed image stored in the memory region 60 does not have an image of the identification at all. Accordingly, it is impossible to trace back to the original image of the identification through the stored compressed image. Therefore, although the stored compressed image in the memory region 60 is leaked to the outside due to various reasons, it is impossible to trace back to the image with respect to the identification of the recognition object 100 without having information about the mask 50. In this point of view, it may be said that the reliability or security maintaining function of the security device according to an exemplary embodiment is much higher than a finger print recognition security device of the related art.

Also, as described above, the light detector 42 that is used for storing the identification of the recognition object 100 as a compressed image includes a single pixel, and this denotes that a single pixel detector is used for storing the identification of the recognition object 100 as a coded compressive image. On the other hand, in the case of a security device of the related art, a charge-coupled device (CCD) array is used for recognizing a fingerprint. Accordingly, when the security device according to an exemplary embodiment is used, the manufacturing cost may be reduced.

Also, as described above, the memory region 60 depicted in FIG. 5 is divided into the first through fourth regions A11, A12, A21, and A22 for convenience of explanation. However, the regions of the memory region 60 may vary depending on the number of patterns of the mask 50 that is used for compressive imaging of the identification of the recognition object 100. That is, the memory region 60 may be divided to suit the number of patterns. For example, if the number of patterns expressed on the mask 50 until the coded compressive image is completed is N, the memory region 60 may also be divided into N.

In the security device according to an exemplary embodiment, an image of a identification (for example, a fingerprint) of the recognition object 100 is stored in a memory as a coded compressive image that is coded by using a mask that functions as a secret key. The coded compressive image is entirely different from the actual image of the identification. Accordingly, even if the coded compressive image stored in a memory is leaked to the outside, it is impossible to trace back to the identification without having information of the mask that is a secret key. In this point of view, the security device according to an exemplary embodiment may increase security reliability and may enhance the security maintaining function.

Also, in the security device according to an exemplary embodiment, masks or patterns included in the mask are random patterns and the random patterns are different for each of security devices. Therefore, when a mask or a pattern included in the mask of a security device in use is exposed to the outside, the security issue may be simply solved by removing the corresponding security device and by using another security device.

Also, in the security device according to an exemplary embodiment, a single pixel detector is used for storing the identification of the recognition object 100 as a coded compressive image. By taking into account that a security device of the related art recognizes a fingerprint by using a CCD array, the use of a security device according to an exemplary embodiment may reduce manufacturing costs.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A security device comprising:
a surface of an apparatus, the surface being configured to support a recognition object;
a light-emitting diode configured to radiate light towards the recognition object;
a mask plate;
a controller configured to:
control the mask plate to have a first optical pattern to code light that is reflected from the recognition object, to generate a first coded light corresponding to an image of the recognition object; and
control the mask plate to have a second optical pattern to code the light reflected from the recognition object, to generate a second coded light corresponding to the image of the recognition object;
a pixel detector configured to detect the first coded light and the second coded light; and
a memory,
wherein the controller is further configured to:
compress the detected first coded light into a first compressed image;
compress the detected second coded light into a second compressed image;
store the first compressed image in a first memory region of the memory;
store the second compressed image in a second memory region of the memory, the second memory region being different than the first memory region, and the first compressed image and the second compressed image respectively stored in the first memory region and the second memory region being combined to form a final compressed image corresponding to the recognition object; and
restore the image from the final compressed image.

2. The security device of claim 1, wherein the apparatus comprises any one or any combination of a display device, a mobile device, a gate, a storage box, and a safe.

3. The security device of claim 1, wherein the mask plate is an active mask plate comprising pixels.

4. The security device of claim 3, wherein the pixels comprise graphene or a two-dimensional material.

5. The security device of claim 1, wherein the mask plate comprises mask plates; and
the mask plates have different respective optical patterns.

6. The security device of claim 1, wherein the pixel detector comprises a pixel.

7. The security device of claim 1, wherein the memory is further configured to store instructions configured to cause the controller to perform functions of the controller.

8. The security device of claim 1, wherein the controller is further configured to compare the final compressed image with an original compressed image that is pre-stored in the memory, to determine whether the recognition object is an owner of the security device.

9. The security device of claim 1, wherein the controller is further configured to restore the image from the final compressed image, using information of the mask plate, the first optical pattern, and the second optical pattern.

10. A security device comprising:
a surface of an apparatus, the surface having a transparent region to which light is incident and being configured to support a recognition object;
a light-emitting diode disposed inside the security device, inclined to the surface of the apparatus, and configured to radiate light towards the transparent region of the surface;
a mask plate inclined to the surface of the apparatus and configured to code light that is reflected from the recognition object, the coded light corresponding to an image of the recognition object;
a pixel detector configured to detect the coded light;
a memory; and
a controller configured to:
   compress the detected coded light into a compressed image;
   store the compressed image in the memory; and
   restore the image from the compressed image,
wherein the recognition object is directly in contact with the transparent region of the surface of the apparatus, and
wherein the pixel detector is disposed between the mask plate and the memory.

* * * * *